Jan. 30, 1923.

C. E. BOWN.
CONDUIT COUPLING.
FILED MAY 1, 1920.

1,443,455.

Inventor
Charles E. Bown,
By Barthel & Barthel
Attorneys

Patented Jan. 30, 1923.

1,443,455

UNITED STATES PATENT OFFICE.

CHARLES E. BOWN, OF DAYTON, OHIO.

CONDUIT COUPLING.

Application filed May 1, 1920. Serial No. 378,210.

*To all whom it may concern:*

Be it known that I, CHARLES E. BOWN, a citizen of the United States of America, residing at Dayton, in the county of Montgomery and State of Ohio, have invented certain new and useful Improvements in Conduit Couplings, of which the following is a specification, reference being had therein to the accompanying drawings.

This invention relates to coupling means for conduits, and more particularly to connecting means particularly applicable for connecting a flexible conduit to the nipples of lubricating devices for motor vehicles whereby lubricant may be forced under heavy pressure into the bearings or other parts to be lubricated.

An object of the invention is to provide means whereby the connection or disconnection may be quickly effected and a tight joint secured without the employment of screw-threads or similar means, thereby eliminating the disadvantages incident to such connections wherein a rotary coupling or uncoupling movement is necessary, and further, to provide means whereby the connection or disconnection is effected with a minimum expenditure of effort on the part of the user and by a simple, longitudinal sliding movement of a member operating to rigidly connect the parts and make a tight joint.

A further object is simplicity in construction and elimination of loss or breakage of parts in use, and to provide certain other new and useful features, all as hereinafter more fully described.

Figure 1:
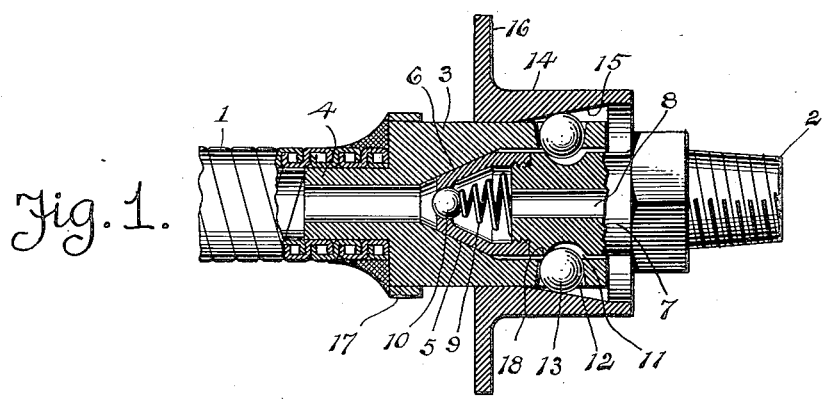
Figure 2:
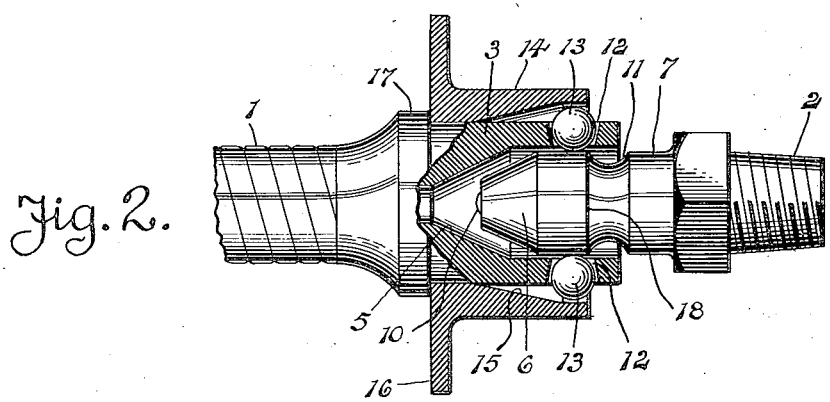

With the above and other ends in view the invention consists in the matters hereinafter set forth, and more particularly pointed out in the appended claim, reference being had to the accompanying drawing, in which Figure 1 is a longitudinal section through a nipple and coupling illustrative of the invention, and Fig. 2 is a view of the coupling, partly broken away and partly in section and showing a nipple in elevation and partly separated from the coupling.

As shown in the drawing, 1 indicates a flexible conduit through which lubricant is to be forced to a bearing or other part adapted to receive the screw-threaded shank 2 for a suitable nipple or like device which is adapted to be permanently attached to the part to be lubricated. The conduit 1 is provided with a head or female member 3 having a hollow stem 4 extending into the tube or conduit 1 and the head permanently secured thereby to the conduit in any suitable manner. The head is formed with an internal bore having a tapered inner end portion 5 forming a seat for the tapered end 6 of a nipple or male member 7 which member is made integral with the screw-threaded shank portion 2 and has a central bore 8 extending therethrough. The end portion 6 of the nipple may be formed hollow to receive a coiled spring 9 adapted to hold a ball valve 10 seated within an inlet opening in the end of the nipple. The nipple is also formed with an external annular groove 11 intermediate its ends and the body 3 or female member is provided with a plurality of tapered holes 12 in its annular wall near the end of the body to receive a series of balls 13, said balls being of greater diameter than the diameter of the inner ends of the openings or holes 12 so that these balls will seat within the openings with their sides projecting through the openings into the bore of the head.

Sleeved upon the female member 3 is a sleeve 14 adapted to slide freely upon said member and this sleeve is formed with an internal bore which is tapered throughout a portion of the length of the sleeve to form a tapering or inclined surface 15 adapted to engage the outer sides of the balls 13 when the sleeve is moved longitudinally on the head and force said balls inwardly in their openings. The sleeve 14 is provided with an annular outstanding flange 16 by means of which it may be moved longitudinally upon the head or female member 3 of the coupling, and this longitudinal movement of the sleeve is limited by an annular ring or rib 17 on the end of the body 3, which ring or stop 17 is so positioned that the sleeve cannot be withdrawn from over the balls 13, thus holding the series of balls in their sockets 12 against dropping out and becoming lost when the female member or head 13 is disconnected from the male member or nipple 7.

The connection with the nipple or male member is quickly made by positioning the sleeve as shown in Fig. 2, against the stop 7 and then entering the nipple into the bore of the head until its tapered end 6 seats upon the tapered inner end portion of the bore. In this position of parts the balls 13 will be in engagement with the annular shoulder formed on the nipple by the groove 11 and then by forcibly moving the sleeve 14 longitudinally upon the female member, the tapered or inclined inner surface of the bore of the sleeve will be brought into engagement with the balls 13 and force them firmly into contact with the edge 18 or shoulder of the groove. The action of crowding the balls inwardly against the shoulder will force the male and female members relatively in a longitudinal direction and firmly seat the tapered end portion 6 upon its seat formed at the inner end of the bore of the female member, thus making a tight joint. At the same time the balls 13 are locked in engagement with the shoulder on the nipple by the sleeve and a rigid connection is made between the head 3 and the nipple. Lubricant may then be forced through the conduit 1 and into the end of the nipple against the action of the spring 9 which tends to hold the valve 10 seated. The disconnection of the head from the nipple is quickly effected by simply pulling longitudinally away from the nipple upon the flange of the sleeve which will move said sleeve upon the head into engagement with the stop thereon and then the head will be pulled longitudinally from engagement with the nipple, the balls 13 being released by the longitudinal movement of the sleeve so that they may move outwardly within their sockets and permit the nipple to be pulled out.

By this construction the conduit is connected to the nipple by a very simple operation which may be effected with a minimum of effort on the part of the operator and the disconnection of the conduit from the nipple is just as easily and quickly effected, there being no parts to be rotated in making the connection or threads or like members to be engaged before the parts are interlocked, the connection being made by the most simple and convenient movement, that is, a simple entering of the male member within the female member and a longitudinal sliding movement of the sleeve to effect the locking of the parts together. When so locked, the parts are rigidly held and any pull upon or twisting motion applied to the conduit will not disconnect the head from the nipple.

Having thus fully described my invention, what I claim is:—

A device of the character described comprising a female member having a hollow stem for the attachment thereto of a conduit and formed with a bore having a tapered inner end forming a seat, the wall of said bore being provided with inwardly tapering openings forming sockets, a ball adapted to seat in each socket with the inner portion of the ball projecting into the bore of the female member, a sleeve slidable upon the female member and formed with a tapering internal bore to engage the outer sides of the balls projecting from said openings and a stop on the female member to limit the longitudinal movement of the sleeve thereon and prevent the withdrawal of the sleeve from over the balls.

In testimony whereof I affix my signature in the presence of two witnesses.

CHARLES E. BOWN.

Witnesses:
 FRANK L. WALKER,
 HARRY F. NOLAN.